(12) United States Patent
Miyazaki et al.

(10) Patent No.: US 8,612,866 B2
(45) Date of Patent: Dec. 17, 2013

(54) INFORMATION PROCESSING APPARATUS, INFORMATION PROCESSING METHOD, AND INFORMATION PROCESSING PROGRAM

(75) Inventors: Mitsuhiro Miyazaki, Kanagawa (JP); Noriyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 630 days.

(21) Appl. No.: 12/326,526

(22) Filed: Dec. 2, 2008

(65) Prior Publication Data

US 2009/0144635 A1 Jun. 4, 2009

(30) Foreign Application Priority Data

Dec. 4, 2007 (JP) ................ P2007-313712

(51) Int. Cl.
*G06F 3/00* (2006.01)

(52) U.S. Cl.
USPC ........................................................ 715/747

(58) Field of Classification Search
USPC ........................................ 715/751–753, 747
See application file for complete search history.

(56) References Cited

U.S. PATENT DOCUMENTS

| 7,031,961 B2* | 4/2006 | Pitkow et al. ........................ 1/1 |
| 7,734,641 B2* | 6/2010 | Kanigsberg et al. .......... 707/765 |
| 7,853,485 B2* | 12/2010 | Song et al. .................... 705/26.8 |
| 2004/0068552 A1* | 4/2004 | Kotz et al. ...................... 709/218 |
| 2005/0171924 A1* | 8/2005 | McGinley et al. ................. 707/1 |
| 2006/0190464 A1* | 8/2006 | Yamamoto ..................... 707/100 |
| 2008/0126176 A1* | 5/2008 | Iguchi ............................. 705/10 |
| 2009/0234745 A1* | 9/2009 | Ramer et al. ............... 705/14.23 |

FOREIGN PATENT DOCUMENTS

| JP | 2004-194107 | 7/2004 |
| JP | 2005-86472 | 3/2005 |
| JP | 2005-519535 | 6/2005 |
| JP | 2006-190164 | 7/2006 |
| JP | 2006-215643 | 8/2006 |
| JP | 2007-26425 | 2/2007 |
| JP | 2007-122683 | 5/2007 |
| WO | WO 2006/126147 A2 * | 11/2006 |
| WO | WO2006126147 | * 11/2006 |
| WO | WO 2006126147 A2 * | 11/2006 |

* cited by examiner

*Primary Examiner* — Omar Abdul-Ali
*Assistant Examiner* — Anil Bhargava
(74) *Attorney, Agent, or Firm* — Finnegan, Henderson, Farabow, Garrett & Dunner, L.L.P.

(57) ABSTRACT

An information processing apparatus for recommending content includes a recommending unit configured to perform a content recommendation process in which a content item is determined on the basis of each of a plurality of strategies, each planned on the basis of a relationship with short term interests, a long term preference, and knowledge of a user.

17 Claims, 8 Drawing Sheets

FIG. 4

| | (SHORT-TERM) INTEREST<br>- GENRE<br>- KEYWORD<br>- MVC CLUSTER<br>- REASON FOR RECOMMENDATION | (LONG-TERM) PREFERENCE<br>- UP SIMILARITY<br>- UP NON-SIMILARITY<br>- UP NON-SIMILARITY IN "DISLIKE" CATEGORY | KNOWN-UNKNOWN DOMAIN FREQUENCY IN MVC @UP | BERRY PICKING GROUP IN GUI |
|---|---|---|---|---|
| A | ○ (SIMILAR) | ○ (SIMILAR) | KNOWN | STRAIGHTFORWARD |
| B | ○ (SIMILAR) | ○ (SIMILAR) | UNKNOWN | |
| C | ○ (SIMILAR) | △ (SHIFT) | KNOWN | PREFERENCE SURPRISE |
| D | ○ (SIMILAR) | △ (SHIFT) | UNKNOWN | |
| E | ○ (SIMILAR) | × DISSIMILAR IN BOTH "LIKES" AND "DISLIKES" CATEGORIES | KNOWN | MAYBE |
| F | ○ (SIMILAR) | × DISSIMILAR IN BOTH "LIKES" AND "DISLIKES" CATEGORIES | UNKNOWN | |
| G | △ (SHIFT) | ○ (SIMILAR) | KNOWN | INTEREST SURPRISE |
| H | △ (SHIFT) | ○ (SIMILAR) | UNKNOWN | |
| I | × (DISSIMILAR) | ○ (SIMILAR) | KNOWN | WELL KNOWN |
| J | × | △ (SHIFT) | UNKNOWN | |
| K | × | △ (SHIFT) | KNOWN | |
| L | × | △ (SHIFT) | UNKNOWN | |
| M | × | × DISSIMILAR IN BOTH "LIKES" AND "DISLIKES" CATEGORIES | KNOWN | |
| N | × | × DISSIMILAR IN BOTH "LIKES" AND "DISLIKES" CATEGORIES | UNKNOWN | |

INFORMATION PROCESSING APPARATUS, INFORMATION PROCESSING METHOD, AND INFORMATION PROCESSING PROGRAM

CROSS REFERENCES TO RELATED APPLICATIONS

The present invention contains subject matter related to Japanese Patent Application JP 2007-313712 filed in the Japanese Patent Office on Dec. 4, 2007, the entire contents of which are incorporated herein by reference.

BACKGROUND OF THE INVENTION

1. Field of the Invention

The present invention relates to an information processing apparatus, an information processing method, and an information processing program and, in particular, to an information processing apparatus, an information processing method, and an information processing program capable of recommending content data to a user while taking into account the changing interests of a user or that matches the user's original preference.

2. Description of the Related Art

Almost all existing content recommendation systems have been developed on the basis of an algorithm of a single strategy of recommendation (refer to, for example, Japanese Unexamined Patent Application Publication No. 2007-026425 or 2007-122683).

SUMMARY OF THE INVENTION

However, if preference information about a user who uses a system is sufficiently learned over time, only predictable content tends to be recommended.

Accordingly, the present invention provides an information processing apparatus and an information processing method for realizing content recommendation that reflects the changing interests of a user, and therefore, does not make the user feel bored or that matches the user's original preference.

According to an embodiment of the present invention, an information processing apparatus for recommending content includes recommending means for performing a content recommendation process in which a content item is determined on the basis of each of a plurality of strategies, each planned on the basis of a relationship with short term interests, a long term preference, and knowledge of a user.

The recommending means can further dynamically change a priority of each of the strategies in accordance with a result of recognizing the user and information as to operations performed by the user.

The recommending means can further dynamically change at least one of displayed information about the recommended content item or a displayed layout of the recommended content item in accordance with a result of recognizing the user with respect to the plurality of strategies and information as to operations performed by the user.

The recommending means can further dynamically change the relationship between each of the short term interest, long term preference, and knowledge of the user and each of the strategies in accordance with a result of recognition of the user with respect to the plurality of strategies and information as to operations performed by the user.

The recommending means can further perform the content recommendation process for a plurality of users using the plurality of strategies.

The recommending means can further perform control so as to display a recommendation list selected for each of the plurality of strategies in the form of separate groups.

According to other embodiments of the present invention, a method and a computer-executable program for use in the information processing apparatus according to the embodiment of the present invention are provided.

In the information processing apparatus, the method, and the computer-executable program according to the embodiments of the present invention, a content recommendation process is performed in which a content item to be recommended is determined on the basis of each of a plurality of strategies, each planned on the basis of a relationship with short term interests, a long term preference, and knowledge of a user.

As noted above, according to the embodiments of the present invention, suitable content can be recommended to users. In particular, content that reflects the changing interests of a user, and therefore, does not bore the user or that matches the user's original preference can be recommended to the user.

BRIEF DESCRIPTION OF THE DRAWINGS

FIG. 4 illustrates an example of a multi-strategy table;

DESCRIPTION OF THE PREFERRED EMBODIMENTS

Various exemplary embodiments of the present invention are described below with reference to the accompanying drawings.

Figure 1:
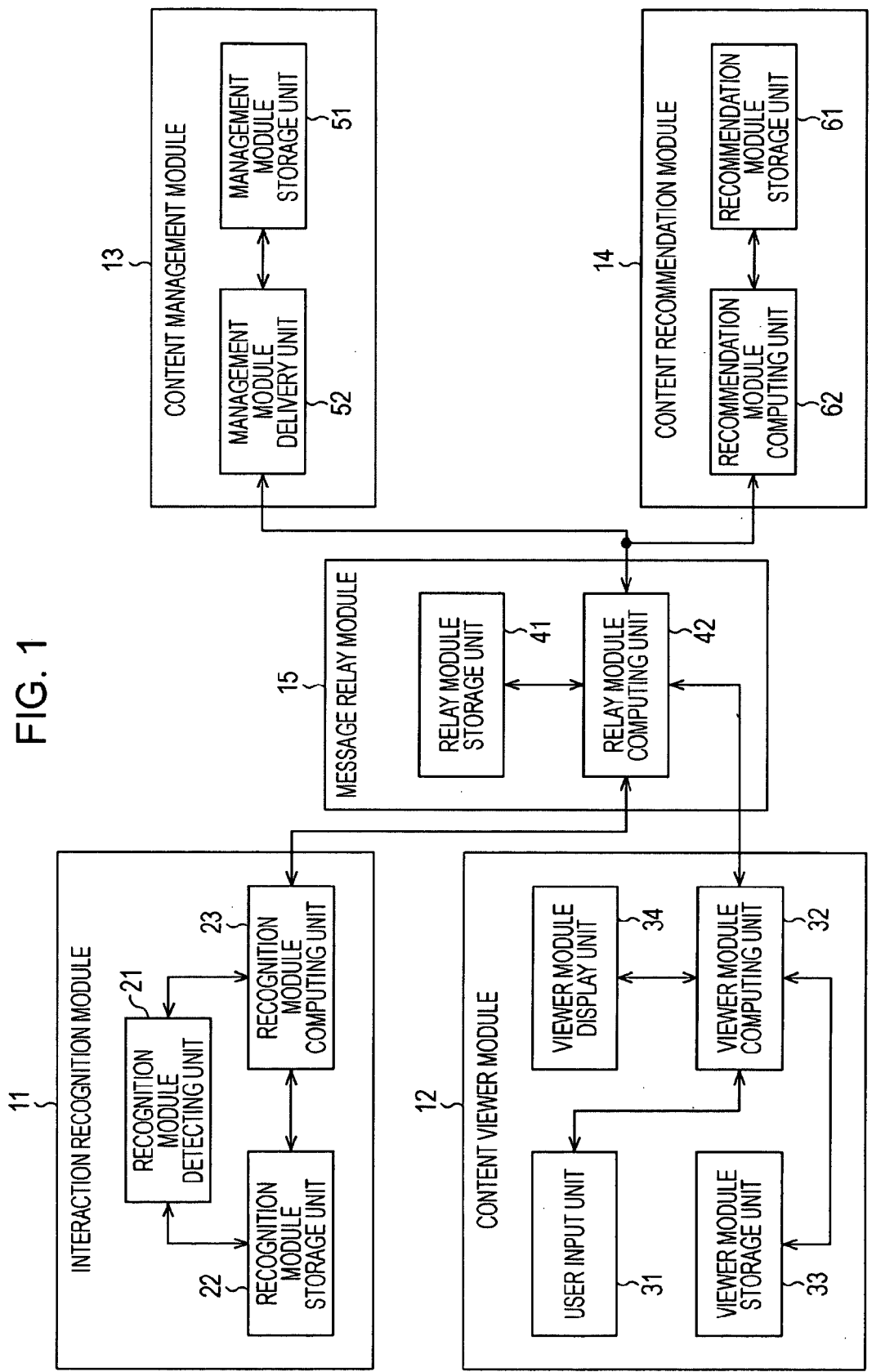
FIG. 1 illustrates an exemplary configuration of an information processing system according to an embodiment of the present invention.

FIG. 1 illustrates an exemplary configuration of an information processing system according to an embodiment of the present invention.

This information processing system can handle content. The term "content" refers to products of human creative activities. Examples of the products include letters, figures, colors, sounds, operations, or video and combinations thereof, such as a movie, music, a drama, literature, a photo, a cartoon, an animation, and a computer game. Further examples of the products include a computer program for providing such information. However, as used herein, content data, that is, products of human creative activities that are processible by apparatuses (e.g., content data in the form of an electrical signal and content data stored in a memory) are also referred to as "content".

As shown in FIG. 1, the information processing system includes an interaction recognition module 11, a content viewer module 12, a content management module 13, a content recommendation module 14, and a message relay module 15.

The interaction recognition module 11 can recognize context information and interaction information.

As used herein, the term "context information" refers to information indicating the external environment or the internal state. The term "external environment" refers to information indicating an external state for a user in the broad sense of the term. Examples of the external environment include a time and a place surrounding the user, and a person whom the user contacts. Further examples of the external environment include weather, a temperature, moisture, brightness, and noise that surround the user. In contrast, the term "internal state" refers to information indicating the user's internal state in the broad sense of the term, such as a psychological state and the fatigue of the user.

The term "interaction information" refers to information indicating interaction between a user and an apparatus regardless of the modality of a user interface. Examples of the interaction information include a user instruction to an apparatus and presentation of information from an apparatus to a user.

Accordingly, it is desirable that the interaction recognition module 11 can detect context information regarding the time, the location, the environment, and the emotion of the user or can detect interaction information for a system. More specifically, for example, the interaction recognition module 11 can include a radio-controlled clock, a global positioning system (GPS) receiver, a speech recognition device, an image recognition device, and a biological information sensor. Alternatively, one of these sensors and devices alone may serve as the interaction recognition module 11. Alternatively, a combination of any two or more sensors and devices may serve as the interaction recognition module 11.

The interaction recognition module 11 includes a recognition module detecting unit 21, a recognition module storage unit 22, and a recognition module computing unit 23.

The recognition module detecting unit 21 detects or measures the context information and interaction information about a user in real time and stores the information in the recognition module storage unit 22 in the form of time-series pieces of information. The recognition module detecting unit 21 performs the detection or measurement under the control of the recognition module computing unit 23.

The recognition module storage unit 22 stores the time-series pieces of context information and interaction information detected or measured by the recognition module detecting unit 21 therein.

The recognition module computing unit 23 analyzes the context information and the interaction information stored in the recognition module storage unit 22 online or offline. The recognition module computing unit 23 then transmits the analysis result to the relay module computing unit 42.

For example, the content viewer module 12 can be configured in the form of a client computer, a consumer electronics (CE) device, and a mobile information device that allow the user to view content. The content viewer module 12 includes a user input unit 31, a viewer module computing unit 32, a viewer module storage unit 33, and a viewer module display unit 34.

The user input unit 31 includes input devices, such as a keyboard, a mouse, a remote control, and a touch panel, that allow user to operate the content viewer module 12. The information about a user input operation input to the user input unit 31 is sent to the viewer module computing unit 32.

Upon receiving the information about the user operation from the user input unit 31, the viewer module computing unit 32 sends the information to a relay module computing unit 42 of the message relay module 15. In addition, the viewer module computing unit 32 stores, in the viewer module storage unit 33, a content recommendation result transmitted from the relay module computing unit 42 of the message relay module 15. Furthermore, the viewer module computing unit 32 controls a display operation performed by the viewer module display unit 34. For example, the viewer module computing unit 32 associates information about content stored in the viewer module storage unit 33 with a reason for the recommendation and appropriately lays out the information on a GUI screen. In addition, the viewer module computing unit 32 sends data stored in the viewer module storage unit 33 to the content recommendation module 14 via the message relay module 15, if necessary.

The viewer module storage unit 33 stores information that is input through a user input operation and that is to be used by the viewer module computing unit 32. In addition, the viewer module storage unit 33 stores information about content recommendation sent from the relay module computing unit 42 of the message relay module 15, The viewer module display unit 34 serves as an output unit. The viewer module display unit 34 includes, for example, a monitor that can display GUI screens containing content-related information (e.g., meta data and reasons of recommendation) and the content itself, a speaker, and a printer. The viewer module display unit 34 displays the information stored in the viewer module storage unit 33 on a GUI screen and prompts the user to perform a certain operation. When the user selects one of content items, the viewer module display unit 34 displays the selected content item and the information associated with the content item.

The content management module 13 can be formed from a broadcast apparatus, a server or client computer, or database software that manages and delivers content items. The content management module 13 includes a management module storage unit 51 and a management module delivery unit 52.

The management module storage unit 51 stores the meta data of a content item and sends the meta data to the management module delivery unit 52. The meta data stored in the management module storage unit 51 may be updated in accordance with an operation rule defined by the content provider.

The management module delivery unit 52 delivers content (e.g., video content, still image content, audio content, or text content) to the relay module computing unit 42 of the message relay module 15. For example, the management module delivery unit 52 can be formed from a delivery server of a television broadcast system or a streaming content server on the Internet.

The content recommendation module 14 can be configured in the form of, for example, a server or client computer or a software module that recommends content to the user. The content recommendation module 14 includes a recommendation module storage unit 61 and a recommendation module computing unit 62.

The recommendation module storage unit 61 stores a variety of information sent from the relay module computing unit 42 of the message relay module 15 (e.g., the meta data of content, information about user input operation, context information, and interaction information). In addition, the recommendation module storage unit 61 stores user preference information that is extracted by the recommendation module computing unit 62 using such information. Furthermore, the recommendation module storage unit 61 stores a computation result related to content recommendation output from the recommendation module computing unit 62 and sends the information that is necessary for the content viewer module 12 to the relay module computing unit 42 of the message relay module 15.

The recommendation module computing unit 62 performs computation for content recommendation using various information stored in the recommendation module storage unit 61 (e.g., the information regarding user input operation, context information, and interaction information) and an algorithm according to the present embodiment of the present invention. Hereinafter, this algorithm is referred to as an "algorithm of the present embodiment". The algorithm of the present embodiment is described in more detail below. The recommendation module computing unit 62 then sends the computation result to the recommendation module storage unit 61. In addition, the recommendation module computing unit 62 extracts user preference information using the various information and sends the extracted user preference information to the recommendation module storage unit 61. Note that, if necessary, the viewer module computing unit 32 of the content viewer module 12 may perform the computation on behalf of the recommendation module computing unit 62.

The message relay module 15 can be configured in the form of, for example, a server/client computer or a software module that relays information among the above-described modules. The message relay module 15 includes, for example, a relay module storage unit 41 and a relay module computing unit 42.

The relay module storage unit 41 stores information to be sent and received to and from the relay module computing unit 42 in the form of time-series data items.

Upon receiving a request, the relay module computing unit 42 sends a variety of information sent from another module, that is, the interaction recognition module 11, the content viewer module 12, the content management module 13, or the content recommendation module 14 to a destination module that sent the request. In the example shown in FIG. 1, the destination module is one of the interaction recognition module 11, the content viewer module 12, the content management module 13, and the content recommendation module 14. The relay module computing unit 42 controls transmission and reception timings and transmission and reception priorities in accordance with the system computation load and the operation rule. If necessary, the relay module computing unit 42 sends the transmitted or received information to the relay module storage unit 41.

According to the present embodiment, the message relay module 15 is not necessarily provided. By directly communicating information among the modules, the content recommendation can be made in accordance with the algorithm of the present embodiment.

In addition, the content recommendation can be made in accordance with the algorithm of the present embodiment on the basis of the information about the user input operation obtained by the content viewer module 12 without using the interaction recognition module 11.

Furthermore, any connection method for connecting the interaction recognition module 11, the content viewer module 12, the content management module 13, the content recommendation module 14, and the message relay module 15 with one another can be used. For example, the connection may be wired or wireless. The connection may be made using the Internet or an intranet.

Typical content and an exemplary structure of the meta data thereof are described below.

Examples of content that is the target of the algorithm of the present embodiment include a television broadcast program (hereinafter simply referred to as a "TV program"), a movie, DVD video, music, and a book. Examples of the meta data that is the target of the algorithm of the present embodiment include a genre, a person, a broadcast station/production company/publishing company, a broadcast hour/production date/publishing date, a content feature, and a cluster group.

For example, when the content is a TV program, the meta data has the following data structure:

Genre=news/reports,
Person=John Smith, Jane Johnson,
Broadcast station=N television,
Broadcast hour=midnight,
Content feature: {keywords="parliament", "stock price", "incident"}
Cluster group X: (cluster ID=1, weight=3.0), {cluster ID=2, weight=5.0}, . . . , and
Cluster group Y: (cluster ID=1, weight=2.0), {cluster ID=2, weight=4.0}, . . .

As used herein, the term "cluster group" refers to a classification result of content items classified using a clustering method and meta data. According to the present embodiment, a "multi-viewpoint clustering method" is employed for the clustering method (refer to Japanese Unexamined Patent Application Publication Nos. 2007-026425 and 2007-122683 invented and filed by the present inventor at the time of filing the present invention).

Figure 2:
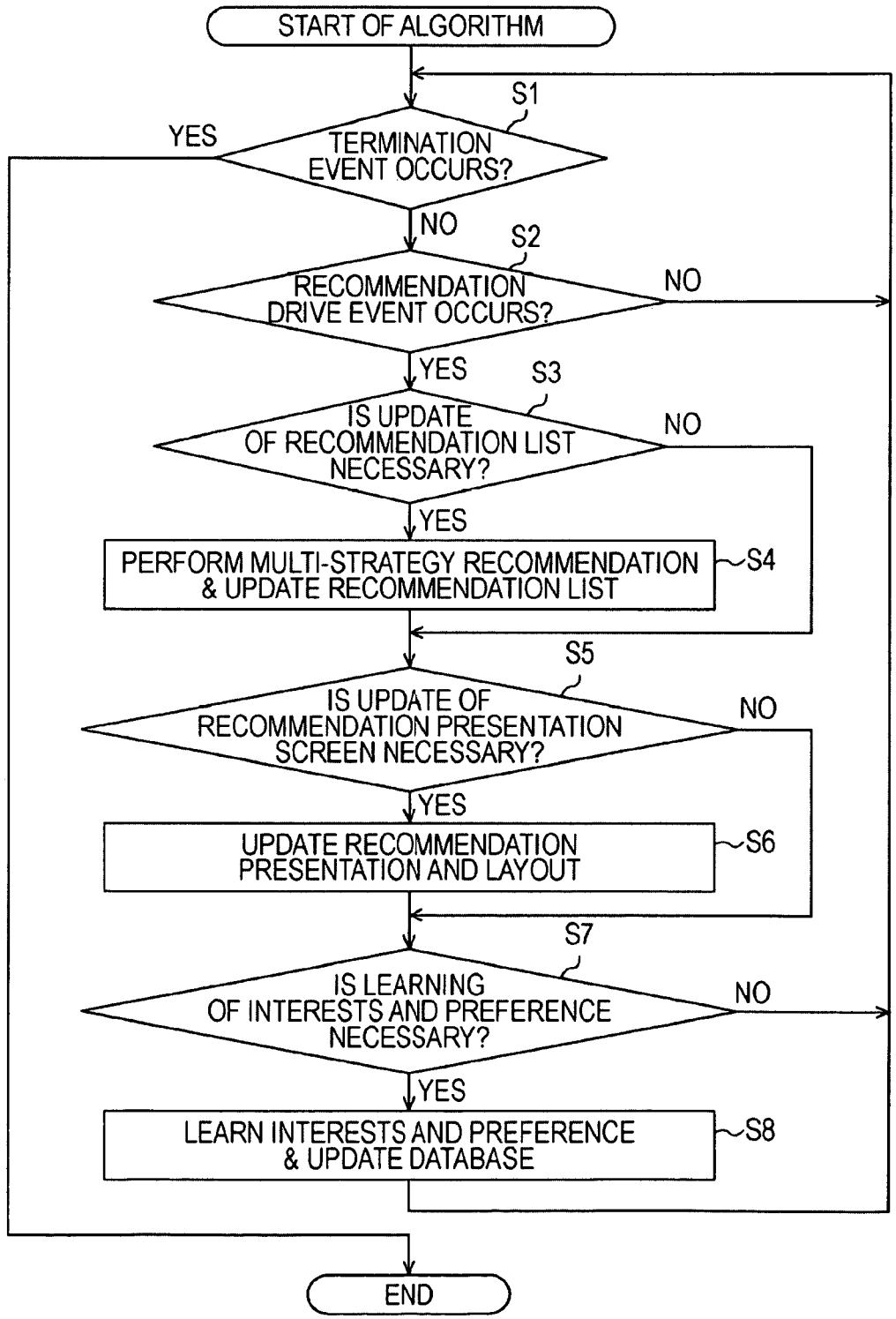
FIG. 2 is a flowchart of an exemplary operation of the information processing system shown in FIG. 1 and illustrates an algorithm according to the embodiment.

The algorithm of the present embodiment is represented by, for example, a flowchart shown in FIG. 2.

In step S1, the information processing system shown in FIG. 1 determines whether a completion event, such as a user request for terminating an application, has occurred.

If a completion event has occurred, it is determined that the answer is "YES" in step S1. Thus, the algorithm of the present embodiment is completed.

However, if a completion event has not occurred, it is determined that the answer is "NO" in step S1. Thus, the processing proceeds to step S2.

In step S2, the information processing system determines whether a recommendation drive event has occurred. As used herein, the term "recommendation drive event" refers to an event determined using user interaction information recognized by the interaction recognition module 11 (e.g., a result of face image recognition or a result of speech recognition of the user utterance) or the information about user input operation detected by the content viewer module 12 (e.g., start of an application or a button click).

However, if a recommendation drive event has not occurred, it is determined that the answer is "NO" in step S2. Thus, the processing returns to step S1. That is, steps S1 and S2 are repeatedly executed until a recommendation drive event or a termination event occurs.

If a recommendation drive event occurs, it is determined that the answer is "YES" in step S2. The processing then proceeds to step S3.

In step S3, the information processing system determines whether update of a recommendation list is necessary in accordance with the information about the recommendation drive event occurred in step S2.

For example, if the presence of a new user is detected, it is determined that update of the recommendation list is necessary. However, if a speech that is not related to a system operation is recognized, it is determined that update of the recommendation list is not necessary.

If update of the recommendation list is necessary, it is determined that the answer is "YES" in step S3. The processing then proceeds to step S4. However, if update of the recommendation list is not necessary, it is determined that the answer is "NO" in step S3. The processing then proceeds to step S5.

In step S4, the information processing system executes a multi-strategy recommendation process so as to update the recommendation list. The multi-strategy recommendation process is described in more detail below with reference to FIG. 3 and the subsequent figures.

In step S5, the information processing system determines whether update of a recommendation presentation screen is necessary in accordance with the information about the recommendation drive event occurred in step S2.

For example, if the user says "I want to know the detailed information about content X", it is determined that update of a recommendation presentation screen (e.g., focus movement or layout change) is necessary. However, if the user is selecting a menu item on the recommendation presentation screen using a mouse, it is determined that update of the recommendation presentation screen is not necessary.

If update of the recommendation presentation screen is necessary, it is determined that the answer is "YES" in step S5. The processing then proceeds to step S6. However, if update of the recommendation presentation screen is not necessary, it is determined that the answer is "NO" in step S5. The processing then proceeds to step S7.

In step S6, the information processing system updates information about the recommendation presentation and the layout in accordance with the information about the user interaction or the information about user input operation.

For example, in step S6, the information processing system focuses a content item selected by the user. In addition, the information processing system changes the recommendation presentation information from the content item in the higher rank of the recommendation list to one in the lower rank in response to a user page change request.

In step S7, the information processing system determines whether learning of the user's interests/preference is necessary in accordance with the information about the recommendation drive event occurred in step S2.

For example, when the user plays back some content item, it is determined that learning of the user's interests/preference is necessary. However, if the user leaves their seat during playback of the content item, it is determined that learning of the user's interests/preference is not necessary.

If learning of the user's interests/preference is necessary, it is determined that the answer is "YES" in step S7. The processing then proceeds to step S8. However, if learning of the user's interests/preference is not necessary, it is determined that the answer is "NO" in step S7. The processing then returns to step S1.

In step S8, the information processing system learns the user's interest data and preference data in accordance with the information about user interaction or user input operation so as to update the database in the viewer module storage unit 33.

As used herein, the term "interest data" refers to data generated from the meta data of content items accessed during a certain short period of time. In addition, the term "preference data" refers to data generated from the meta data of content items accessed during a certain long period of time.

Note that the terms "short" and "long" have no absolute meaning, but have relative meaning when the period of time for the interest data is compared with that for the preference data. That is, when a certain period of time for interest data is compared with a certain period of time for the preference data, the certain period of time for interest data is shorter than the certain period of time for the preference data, or the certain period of time for preference data is longer than the certain period of time for the interest data. In this context, the terms "short" and "long" are used.

In addition, the start point of a certain period of time for interest data is not necessarily equal to that for preference data. Furthermore, any method for generating and updating the interest data and preference data can be employed in the present embodiment. For example, the method described in the specification and figures of Japanese Patent Application No. 2006-33227 filed by the present inventor at the time of filing the present invention can be employed. Still furthermore, a plurality of interest data items and a plurality of preference data items may be generated and stored for each of a genre and a context.

Figure 3:
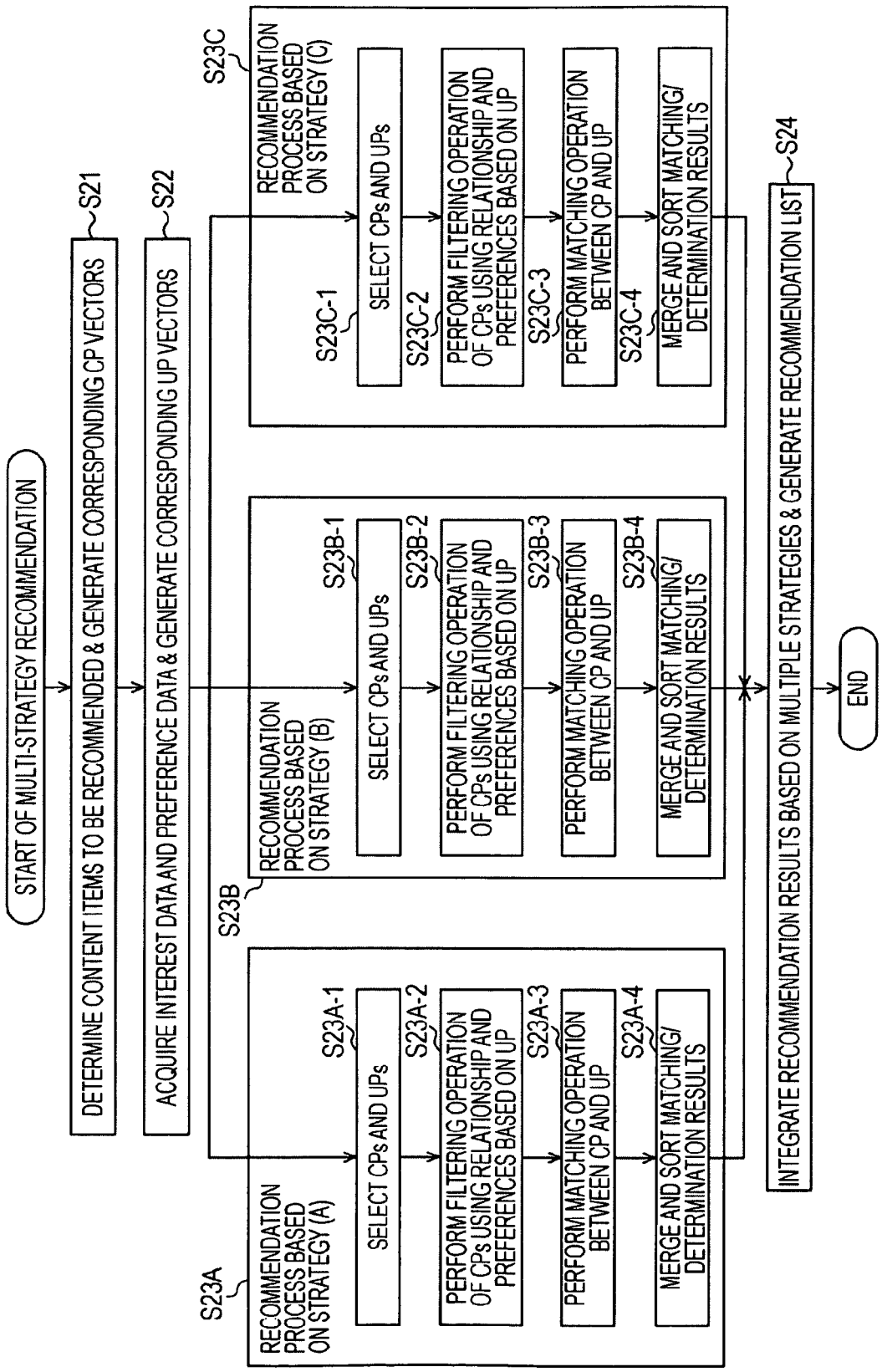
FIG. 3 is a flowchart of a multi-strategy recommendation process performed in step S4 shown in FIG. 2.

FIG. 3 is a flow chart illustrating an example of a multi-strategy recommendation process performed as part of the process of step S4 shown in FIG. 2.

As used herein, the term "multi-strategy recommendation process" refers to a process in which recommended content items are determined through a plurality of different algorithms using interest data and preference data, the plurality of recommended content items are integrated, and a recommendation list is generated.

More specifically, the following sub-processes are performed, for example.

In step S21, the information processing system determines content items to be recommended in accordance with the specification of the system or the user requirement (e.g., a selected genre) and generates corresponding CP vectors.

In step S22, the information processing system acquires the interest data and the preference data from the database and generates a plurality of UP vectors to be matched.

Note that the CP vector to be processed is generated from the meta data of the content item to be recommended.

More specifically, for example, if the content item to be recommended is a song, the CP vector to be processed can be expressed as the following k-dimensional vector including elements VA representing property items of the song, such as an "artist name" and a "genre":

CP vector to be processed={VA1, VA2, . . . VAk}

Here, the element VAi (i=1, 2, . . . k) is the following vector including elements c corresponding to the meta data belonging to the property item:

VAi=(c1, c2, . . .

That is, for example, a "genre" vector VA, which is an element VA, includes the following elements c: "pops", "jazz", "classical", "techno" and so on. The "genre" vector VA of a song having a "genre" of pops is expressed as follows:

"genre" vector VA=(pops, jazz, classical, techno, . . . )

"genre" vector VA=(1, 0, 0, 0, . . .

On the other hand, the UP vector is a feature vector that represents user preference information. The UP vector is generated using a feature vector generated from a variety of meta data. Accordingly, the UP vector is also referred to as a "user preference vector".

Note that, according to the present embodiment, a plurality of the UP vectors are generated in accordance with the acquired interest data and the preference data. That is, for example, when interest data A, interest data B, and preference data C are acquired, at least two of the following seven types of UP vector are generated: a UP vector of a first type generated in accordance with the interest data A; a UP vector of a second type generated in accordance with the interest data B; a UP vector of a third type generated in accordance with the preference data C; a UP vector of a fourth type generated in accordance with a combination of the interest data A and the interest data B; a UP vector of a fifth type generated in accordance with a combination of the interest data A and the preference data C; a UP vector of a sixth type generated in accordance with a combination of the interest data B and the preference data C; and a UP vector of a seventh type generated in accordance with a combination of the interest data A, the interest data B, and the preference data C.

Note that any method for generating a CP vector to be processed and a UP vector to be processed can be employed. For example, the method described in the specification and figures of Japanese Patent Application No. 2006-33227 filed by the present inventor at the time of filing the present invention can be employed.

A subsequent branching process performed in accordance with one of the multiple strategies is described next. In the example shown in FIG. 3, recommendation processes in steps S23A, S23B, and S23C are independently and concurrently performed on the basis of strategies (A), (B), and (C), respectively. It should be appreciated that the number of branches is not limited to three described in the example of FIG. 3. For example, any number of strategies can be applied in accordance with a system or user requirement.

The recommendation process based on the strategy (A) is performed in step S23A as follows.

In substep S23A-1, the information processing system selects a CP vector to be recommended based on the strategy (A) and a UP vector that is necessary for the recommendation process.

In substep S23A-2, the information processing system acquires a relationship between CP vectors and the UP vector in the strategy (A) and performs a filtering process by determining a preference using the UP vector so as to narrow down the number of content items to be recommended. For example, by narrowing down the number of content items to be recommended using determination of preference using the UP vector generated in accordance with interest data (hereinafter, the UP vector is appropriately referred to as an "interest UP vector"), the information processing system can select content items that match a user's short term interest.

In substep S23A-3, the information processing system performs a matching operation between each of the CP vectors of the narrowed-down content items and the UP vector. For example, by performing a matching operation between each of the CP vectors of the narrowed-down content items and the UP vector that is generated in accordance with the preference data (hereinafter, the UP vector is appropriately referred to as a "preference UP vector"), the information processing system can select content items that match a user's long term preference.

In substep S23A-4, if a plurality of the content items are selected as a result of the filtering operation and the matching operation performed in the preceding steps, the information processing system performs a merge operation. If necessary, the information processing system further performs a sort operation. For example, by merging the result of the matching operation against the preference UP vector and the result of the matching operation against the interest UP vector, the information processing system can recommend content items that are selected while taking into account the short term interest and the long term preference.

In a recommendation process based on the strategy (B) performed in step S23B, substeps S23B-1 to S23B-4 respectively corresponding to the above-described substeps S23A-1 to S23A-4 of step S23A are executed. However, in substeps S23B-1 to S23B-4, processing based on the strategy (B) is performed.

In a recommendation process based on the strategy (C) performed in step S23C, substeps S23C-1 to S23C-4 respectively corresponding to the above-described substeps S23A-1 to S23A-4 of step S23A are executed. However, in substeps S23C-1 to S23C-4, processing based on the strategy (C) is performed.

Any computing method can be employed in the above-described steps S23A to S23C. For example, the method described in the specification and figures of Japanese Patent Application No. 2006-33227 filed by the present inventor at the time of filing the present invention, that is, a music playlist generation algorithm, can be employed.

In step S24, the information processing system integrates the processing results of steps S23A, S23B, and S23C. That is, the information processing system integrates the recommendation results based on the strategies (A), (B), and (C) and generates recommendation lists on the basis of the integration result. For example, the information processing system generates a recommendation list (A), a recommendation list (B), and a recommendation list (C). Subsequently, the information processing system presents the recommendation lists to the user.

After these steps are performed, the multi-strategy recommendation process is completed.

An example of the multiple strategies is described next.

FIG. 4 illustrates an example of the multiple strategies. In this example, fourteen strategies A to N are defined using three methods for selecting CP vectors: a short term interest, a long term preference, and knowledge (known/unknown).

That is, the fourteen types of strategies A to N are strategies for selecting recommendation content items, namely, CP vectors. Each of the fourteen strategies is defined by the combination of three methods for selecting CP vectors: a short term interest, a long term preference, and knowledge (known/unknown).

The short term interest indicates a method in which, for example, the similarity between the above-described interest UP vector and CP vector is computed, and the CP vectors are classified into a similar group (represented as "O") and a dissimilar group (represented as "X") using a threshold value of the similarity or the number of content items to be selected from the top.

Figure 5:
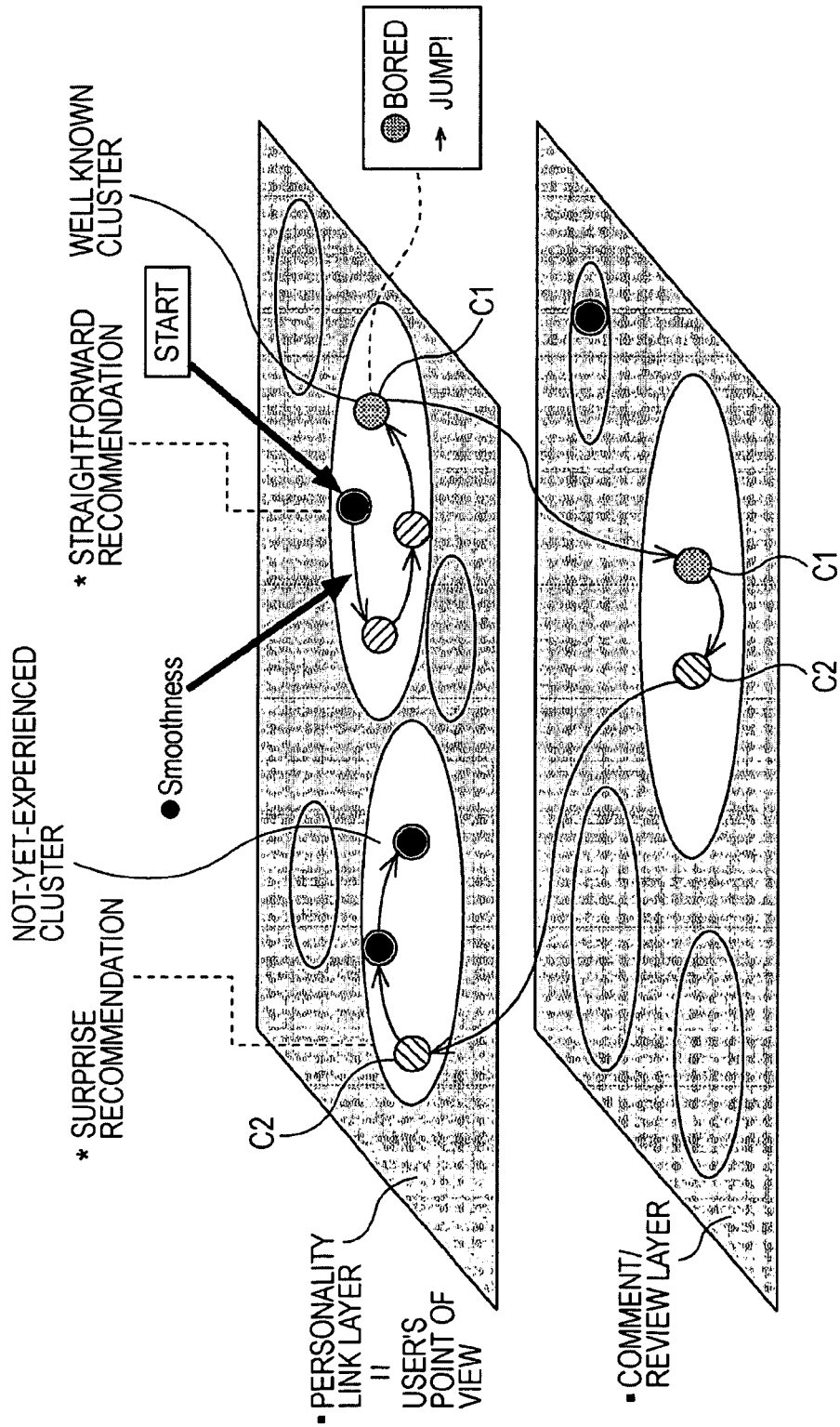
FIG. 5 illustrates an example of a relationship between preferences.

However, according to the present embodiment, the result includes a shift (represented as "Δ") in addition to "O" (similar) and "X" (dissimilar). The term "shift" is defined as follows. That is, for example, as shown in FIG. 5, at least two layers (a personality linkage layer and a comment/review layer in the example shown in FIG. 5) are present. As shown in FIG. 5, it is defined that there is a shift relationship between a content item (a content item C1) that serves as an element of an interest UP vector located in a predetermined cluster (a large white ellipse) in a given layer (the comment/review layer) and a content item (a content item C2 that belongs to a not-yet-experienced layer different from a well-known cluster to which the content item C1 belongs) that belongs to the same cluster in that layer and that belongs to a different cluster in a different layer (the personality linkage layer). Subsequently, a CP vector having a shift relationship is selected as a shift ("Δ").

By applying such a "shift", a surprise recommendation can be made for a user. For example, a TV program in which an unknown TV personality (a TV program that belongs to the not-yet-experienced layer in the personality linkage layer) appears can be selected from among TV programs having content and mood similar to those of a TV program in which a user's favorite TV personality appears (a TV program that belongs to the same cluster in the comment/review layer).

In such a case, any clustering method can be employed. For example, the multi-viewpoint clustering method described in the specification and figures of Japanese Patent Application Nos. 2005-176519, 2005-281357, 2006-151011, and 2006-151012 filed by the present inventor at the time of filing the present invention can be employed.

Referring back to FIG. 4, for example, the term "long term preference" refers to a method for selecting a CP vector by computing the similarity between the above-described preference UP vector (in a likes/dislikes category) and a CP vector and determining whether the CP vector is in the "O" (similar) group or in the "X" (dissimilar in both likes and dislikes categories) using a predetermined threshold value of the similarity or the number of content items to be selected.

However, as for the "short term interest", the determination results include a shift group ("Δ") in addition to a similar group "O" and a dissimilar group ("X")

The term "knowledge (known/unknown)" refers to the following method. That is, in the clustering shown in FIG. 5, a cluster in which the number of content items that are elements of the preference UP vector (also referred to as "frequency") is large is defined as a known cluster. In contrast, a cluster in which the frequency is small is defined as an unknown cluster. In this method, a CP vector is determined whether it is known or unknown in accordance with the cluster to which the CP vector belongs, and the CP vectors to be recommended are narrowed down in accordance with the selected strategy.

The above-described three methods can be applied to any one of substeps S23A-1 to S23A-3 shown in FIG. 3. In addition, the sequence of application of the methods can be changed or part of the sequence may be removed. Similarly, the above-described three methods can be applied to any one of substeps S23B-1 to S23B-3 shown in FIG. 3. In addition, the sequence of application of the methods can be changed or part of the sequence may be removed. Similarly, the above-described three methods can be applied to any one of substeps S23C-1 to S23C-3 shown in FIG. 3. In addition, the sequence of application of the methods can be changed or part of the sequence may be removed.

For example, in FIG. 4, the effective recommendation strategies are the following five strategies:

Strategy A: short term interest "O", long term preference "O", "known"→"straightforward";

Strategy C: short term interest "O", long term preference "Δ", "known"→"preference surprise";

Strategy E: short term interest "O", long term preference "x", "known"→"maybe";

Strategy G: short term interest "Δ", long term preference "O", "known"→"interest surprise"; and Strategy I: short term interest "x", long term preference "O", "known"→"well known".

Note that the word between the quotes to the left of the arrow represents the characteristic of the strategy. It can be used as the name of the strategy.

If any three of the five strategies A to I, for example, the strategy A (straightforward), the strategy C (preference surprise), and the strategy E (maybe), are employed, the strategy A (straightforward) is applied to the processing performed in step S23A shown in FIG. 3, the strategy C (preference surprise) is applied to the processing performed in step S23B, and the strategy E (maybe) is applied to the processing performed in step S23C.

That is, by adding, to steps S23A to S23C shown in FIG. 3, new steps S23D and S23E that can execute the corresponding processes, all of the five strategies A to I can be employed.

Figure 6:
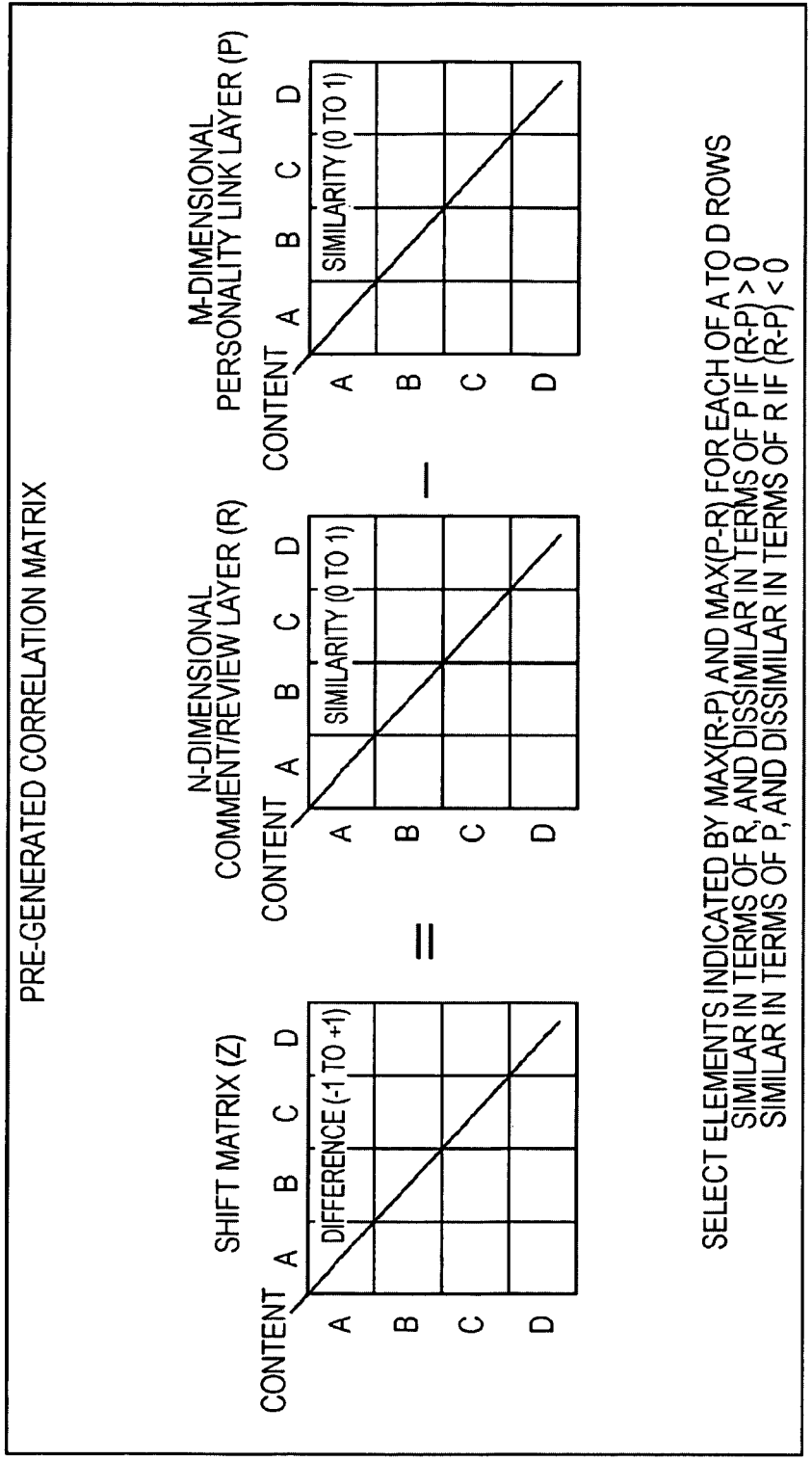
FIG. 6 illustrates an example of a content-content similarity matrix.

If a shift (Δ) is present in the strategy, a filtering process of the content items to be recommended (e.g., the processing performed in substep S23A-2) can be performed as shown in FIG. 6. That is, the information processing system generates a content-content similarity matrix in each layer (matrices R and P) and, subsequently, generates a difference matrix Z between the matrices R and P. For example, in an example shown in FIG. 6, the matrix R is generated for the comment/review layer shown in FIG. 5. The matrix P is generated for the personality linkage layer shown in FIG. 5. Subsequently, the difference matrix Z between the two matrices R and P is generated. If the similarity is expressed by using a cosine, each of the value of R and P is a real number ranging from 0 to 1. The value of Z is a real number ranging from −1 to 1. Accordingly, the information processing system selects a certain number of context IDs in descending order of the absolute value thereof from the top down for each of the rows of the matrix Z so as to generate a table ZT. Subsequently, when making a surprise recommendation, the information processing system acquires a content ID list from the table ZT for a recommendation content item x obtained using the straightforward strategy. The information processing system then selects a certain number of the content IDs in descending order from the largest value. Thus, the information processing system performs a filtering process of the content items to be recommended.

Figure 7:
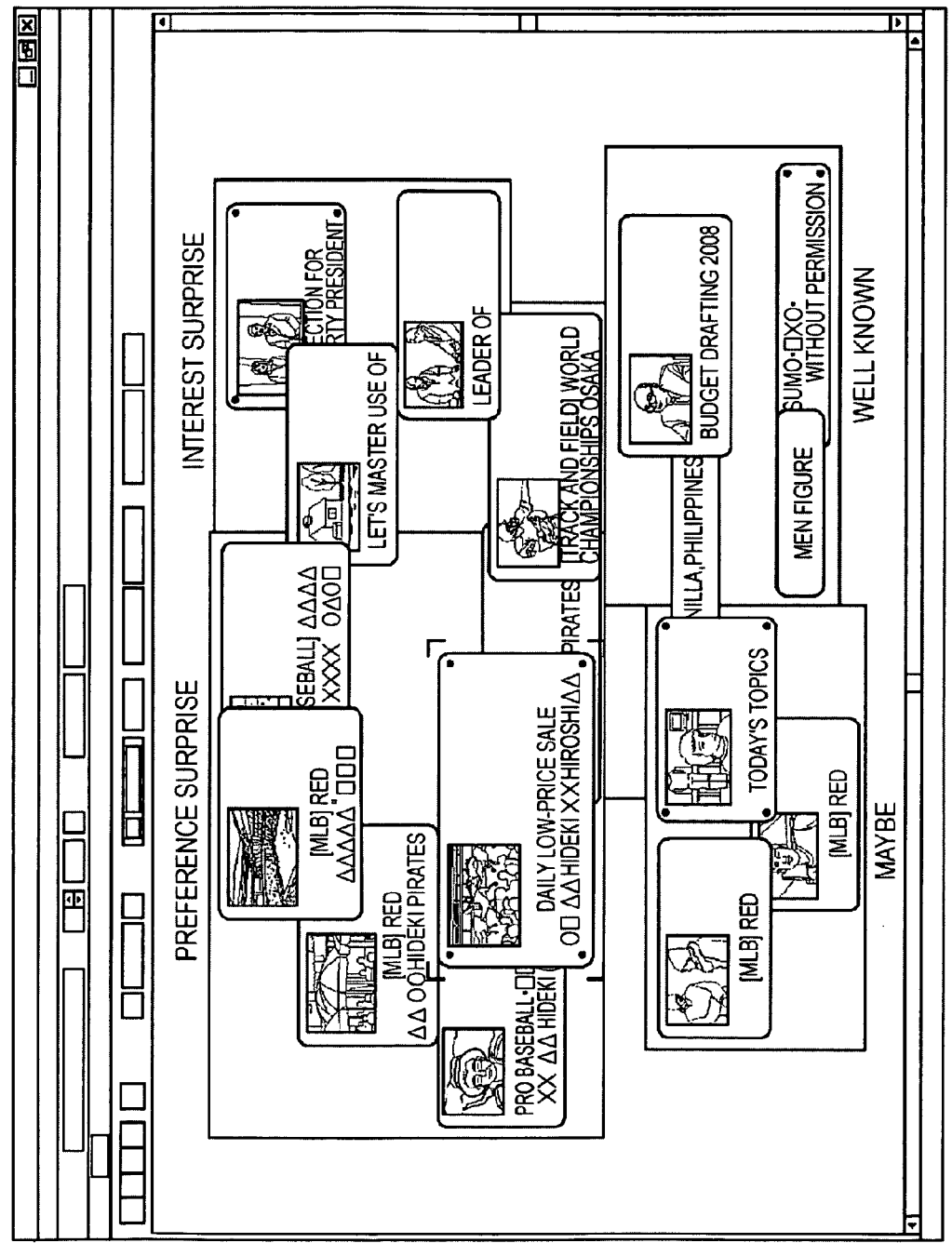
FIG. 7 illustrates an example of a recommendation presentation screen.

In this way, all of the five strategies A to I are employed. The recommendation process for each of the strategies A to I, that is, the processing from steps S23A to S23E, is performed, and the processing corresponding to step S24 shown in FIG. 3 is performed. As a result, as shown in FIG. 7, a recommendation presentation screen is displayed on the viewer module display unit 34. In the recommendation presentation screen shown in FIG. 7, top-ranked content items of the strategies A to I are classified into groups and are displayed. That is, a recommended content item is represented as a box including the title and the thumbnail image thereof, and the box is displayed in a frame indicating the corresponding strategy. Accordingly, the box of a content item that is recommended through a plurality of strategies is displayed across a plurality of the frames corresponding to the strategies.

The focus on the display can be changed in response to a user speech or a user mouse operation. The number of boxes displayed in a focused frame of the recommendation group (strategy) can be increased. In addition, the information displayed in the box of the content item can be changed. More specifically, for example, meta data displayed in a ticker format can be changed, as described in the specification and figures of Japanese Patent Application No. 2006-33227 filed by the present inventor at the time the present invention was filed.

An exemplary method for changing the strategy is described next.

That is, as indicated by the recommendation presentation screen shown in FIG. 7, in order to use a plurality of strategies, a recommendation list may be generated and displayed for each of all of the strategies. Alternatively, the priority of each of the strategies may be dynamically changed in accordance with the system purpose and the preference of the user. More specifically, for example, the priorities of the strategies can be personalized depending on which one of the short term interest and the long term preference is more important or which one of the known cluster or the unknown cluster is more important for the user on the basis of the user characteristic.

As used herein, the term "user characteristic" refers to at least one of the user's aspiration, the range of the user's taste, the depth of the user's knowledge, and the maturity of the user (hereinafter, such information is referred to as "characteristic information"). The "aspiration" is information about the popularity of content and, more particularly, information as to whether the popularity of content is high or niche. The "range of the user's taste" is information as to how wide a range of recommendation of content the user accepts or how wide the focus area of recommendation is. The "depth" is information as to how frequently the user experienced (viewed/listened to) content in a given cluster. Further information is provided in the specification and figures of Japanese Patent Application No. 2006-300632 filed by the present inventor at the time of filing the present invention.

An alternative method for changing the strategy is described next. When the user declares that they are bored with a content item, the information processing system may increase the number of recommended content items by increasing the area of the surprise strategy rather than that of the straightforward strategy in the GUI. Alternatively, the strategy for a content item that is not accessed for a certain period of time may be changed to another strategy, and recommended content items may be presented in accordance with the new strategy. In addition, straightforward recommendation may be mainly used for users having a deep and narrow characteristic, while a plurality of the strategies may be evenly used for users who are easily interested in the current hottest topic.

According to the algorithm of the present embodiment, preferences of a plurality of users can be employed. That is, if the interaction recognition module 11 recognizes the presence of a plurality of users or the content viewer module 12 receives login information about a plurality of users, content recommendation can be made on the basis of preferences of the plurality of users. For example, a recommendation list that reflects preferences of users X and Y can be generated in a manner described below.

Here, the generation process of the recommendation list is applied to step S23A of the recommendation process of the strategy (A) shown in FIG. 3. However, it should be appreciated that the generation process can be similarly applied to the recommendation processes of the other strategies, for example, the processing performed in steps S23B and S23C.

The information processing system, in substep S23A-2, determines the preference of the user X using a UP vector for the user X and separately determines the preference of the user Y using a UP vector for the user Y. The information processing system then removes a content item for which the preference of the user X does not match the preference of the user Y. Thereafter, in substep S23A-3, the information processing system performs a matching process using the UP vector for the user X and separately performs a matching process using the UP vector for the user Y. Subsequently, in substep S23A-4, the information processing system merges the results of the matching processes so as to obtain a recommendation result.

In order to determine which one of a plurality of users is focused on in terms of preference, the following method can be employed. For example, the interaction recognition module 11 may focus on a user who frequently speaks or a user who frequently accesses or operates the content viewer module 12.

As described above, according to the present embodiment, the information processing system can employ a recommendation algorithm based on strategies in accordance with short term interests and a long term preference. Accordingly, the information processing system can recommend content items that take into account a possible change in the user's interests and, thus, do not cause the user to feel bored. In addition, the information processing system can recommend content items that match the original user's preference.

Furthermore, according to the present embodiment, since the information processing system employs a recommendation algorithm based on multiple strategies, the user can compare a plurality of recommendation lists with one another. Still furthermore, the information processing system can present a combination of meta data items serving as a set of recommendation lists using, for example, the algorithm described in the specification and figures of Japanese Patent Application No. 2005-215906 filed by the present inventor at the time the present invention was filed. Accordingly, the user can instantaneously determine the themes of individual recommendation lists.

In addition, the information processing system can learn an accurate user's preference for a content item by recognizing the user interaction while the user is viewing or listening to the content and a feedback related to the preference from a user through a user's operational activity. Furthermore, the information processing system can update the user's preference data at a time point appropriate for the user's characteristic.

Still furthermore, by using the recommendation algorithm based on preferences of a plurality of users, recommendation of content items that match the short term interests and the long term preferences of the plurality of users, for example, in a home living environment can be made. As a result, a new content recommendation method for a family or a group can be provided.

That is, by using the information processing system according to the present embodiment, the above-described first problem of the existing systems can be solved. Furthermore, the following second to fifth problems can be solved.

The second problem is that, although many Internet shops offer services such as personalized search or recommendation of related products, the recommended content frequently changes in accordance with the immediately previous user operation. Therefore, the recommendation tends not to match the user's preference.

The third problem is that GUIs of existing content recommendation services display recommended content items only in the form of an electronic program list, a single recommendation list, or tab-switchable multiple lists. Accordingly, it is difficult for a user to compare a plurality of recommendation lists with one another. It is also difficult for a user to instantaneously understand the theme of the recommendation list.

The fourth problem is that, when an existing content recommendation system learns a user's preference using information regarding user operations, it is necessary to simply update the preference information on the basis of the user operations performed on a content item (e.g., a playback operation, a recording operation, a skip operation, and an erase operation) or request the user to input evaluation of the content item. In such a case, the learned information may not match the intent of the user, and the input of evaluation is troublesome for the user.

The fifth problem is that existing content recommendation systems are designed to respond to a request from a single user performed using a pointing device on a PC or a CE device. Accordingly, it is difficult to make a recommendation that matches the interests and preferences of a plurality of users who use the system.

The above-described series of processes can be executed not only by hardware but also by software.

Figure 8:
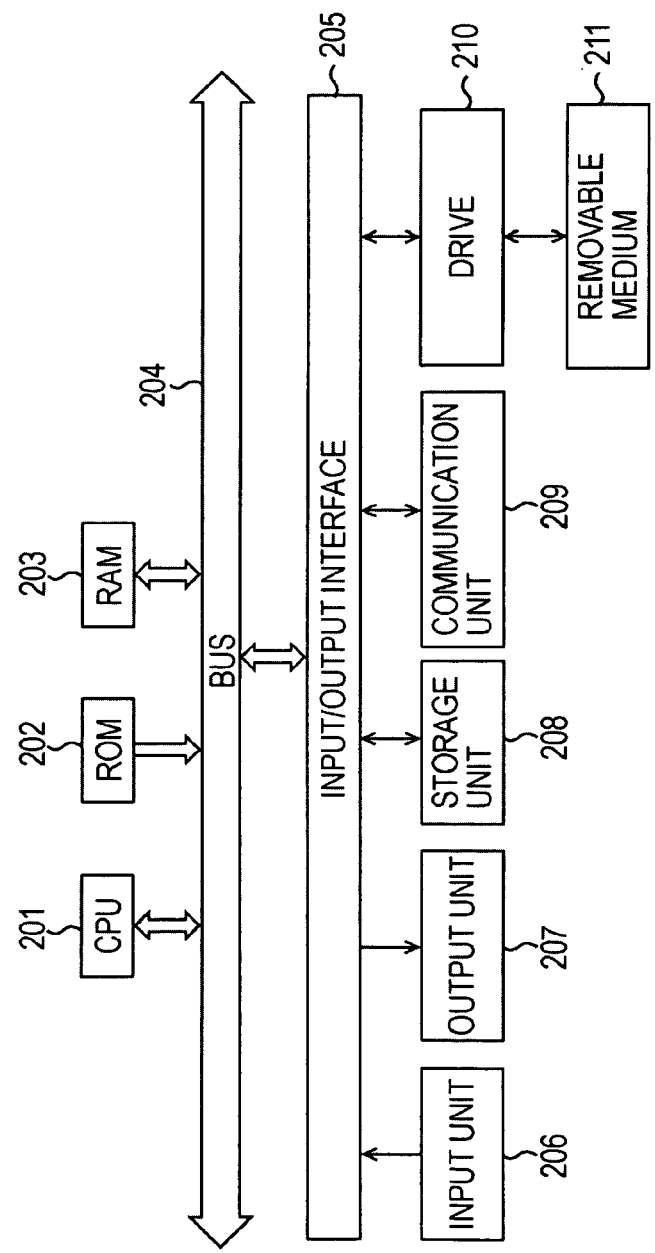
FIG. 8 is a block diagram of an exemplary configuration of a personal computer serving as the information processing system according to the embodiment of the present invention.

In such a case, for example, a personal computer having a configuration as shown in FIG. 8 may be used for at least part of the above-described information processing system.

As shown in FIG. 8, a central processing unit (CPU) 201 performs a variety of processes in accordance with a program stored in a read only memory (ROM) 202 or a program loaded from a storage unit 208 into a random access memory (RAM)

203. Data used by the CPU 201 when the CPU 201 performs a variety of processes are also stored, if necessary.

The CPU 201, the ROM 202 and the RAM 203 are connected to one another via a bus 204. An input and output interface 205 is further connected to the bus 204.

The following units are connected to the input and output interface 205: an input unit 206 including a keyboard and a mouse, an output unit 207 including a display, a storage unit 208 including, for example, a hard disk, and a communication unit 209 including a modem or a terminal adapter. The communication unit 209 controls communication with another apparatus (not shown) connected via a network including the Internet.

A drive 210 is further connected to the input and output interface 205, if necessary. A removable medium 211, such as a magnetic disk, an optical disk, a magneto-optical disk, or a semiconductor memory, is mounted in the drive 210, if necessary. A computer-executable program read out from the medium is installed in the storage unit 208, if necessary.

When the above-described series of processes are executed by software, the programs of the software are downloaded from a network or a recording medium into a computer incorporated in dedicated hardware or a computer that can execute a variety of function by installing a variety of programs therein (e.g., a general-purpose personal computer).

As shown in FIG. 8, a recording medium including such a program may be a removable recording medium (a package medium) 211, which is distributed separately from a hardware body in order to provide the program to users. Examples of the recording medium include a magnetic disk (including a floppy disk), an optical disk (including a compact disk-read only memory (CD-ROM) and a digital versatile disk (DVD)), a magneto-optical disk (including a mini-disk (MD)), and a semiconductor memory. Alternatively, the recording medium may be the ROM 202 or a hard disk incorporated in the storage unit 208 having the program pre-installed therein and included in the hardware body.

In the above-described embodiment, the steps that describe the program stored in the recording media include not only processes executed in the above-described sequence, but also processes that may be executed in parallel or independently.

In addition, in the above-described embodiment, the term "system" refers to a combination of a plurality of devices and processing units. That is, the information processing system shown in FIG. 1 can be formed from a single device, such as the personal computer shown in FIG. 8.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for recommending content, comprising:
a processor, the processor including a content recommendation module for performing a content recommendation process in which a content item is determined by performing selection, filtering, and matching operations on the basis of each of a plurality of strategies, each strategy independently and concurrently performed based on a relationship with short term interests, a long term preference, and knowledge of a user;
wherein the short term interests indicate a method wherein the similarity between an interest user preference vector and a recommendation vector is computed, the recommendation vector being classified into a similar, dissimilar, and shift group, the shift group indicating a shift relationship between a first content item that serves as an element of the interest user preference vector located in a first predetermined cluster in a first layer and a second content item that belongs to the first cluster in the first layer and a second cluster in a second layer,
wherein the long term interests indicate a method wherein the similarity between a preference user preference vector and the recommendation vector is computed, the recommendation vector being classified into a similar, dissimilar, or shift group; and
wherein the knowledge indicates a method wherein the recommendation vector is determined as known or unknown in accordance with a cluster to which the recommendation vector belongs; the recommendation vector being determined as known when a cluster in which the number of content items that are elements of the preference user preference vector is large and the recommendation vector being determined as unknown when a cluster in which the number of content items that are elements of the preference user preference vector is small.

2. The information processing apparatus according to claim 1, wherein the content recommendation module further dynamically changes a priority of each of the strategies in accordance with a result of recognizing the user and information as to operations performed by the user.

3. The information processing apparatus according to claim 1, wherein the content recommendation module further dynamically changes at least one of displayed information about the recommended content item or a displayed layout of the recommended content item in accordance with a result of recognizing the user with respect to the plurality of strategies and information as to operations performed by the user.

4. The information processing apparatus according to claim 1, wherein content recommendation module further dynamically changes the relationship between each of the short term interest, long term preference, and knowledge of the user and each of the strategies in accordance with a result of recognition of the user with respect to the plurality of strategies and information as to operations performed by the user.

5. The information processing apparatus according to claim 1, wherein the content recommendation module further performs the content recommendation process for a plurality of users using the plurality of strategies.

6. The information processing apparatus according to claim 1, wherein the content recommendation module further performs control so as to display a recommendation list selected for each of the plurality of strategies in the form of separate groups.

7. An information processing apparatus according to claim 1, wherein the selection operation includes selecting recommendation vectors to be recommended based on the strategy and an user preference vector that is necessary for the recommendation process.

8. An information processing apparatus according to claim 7, wherein the filtering operation includes acquiring a relationship between the recommendation vectors and the user preference vector in the strategy and performing a filtering process by using the interest user preference vector to narrow the number of content items to be recommended.

9. An information processing apparatus according to claim 8, wherein the matching operation includes matching each of the recommendation vectors of the narrowed-down content items and the preference user preference vector.

10. An information processing apparatus according to claim 1, wherein the short term interests, long term preferences, and knowledge of a user can be applied to any one of the selection, filtration, and matching operations.

11. An information processing apparatus according to claim 1, wherein the content item is further determined by performing a merge and sort operation.

12. An information processing apparatus according to claim 1, wherein the plurality of strategies includes at least three strategies.

13. An information processing apparatus according to claim 1, wherein the content recommendation process integrates recommendation results based on each of the plurality of strategies and generates recommendation lists based on the integration result.

14. An information processing apparatus according to claim 11, wherein the filtering operation follows the selection operation, matching operation follows the filtering operation, and the merge and sort operation follows the matching operation.

15. A computer-implemented method for recommending content, comprising the step of:

using a processor to perform a content recommendation process in which a content item to be recommended is determined by performing selection, filtering, and matching operations on the basis of each of a plurality of strategies, each strategy independently and concurrently performed based on a relationship with short term interests, a long term preference, and knowledge of a user;

wherein the short term interests indicate a method wherein the similarity between an interest user preference vector and a recommendation vector is computed, the recommendation vector being classified into a similar, dissimilar, and shift group, the shift group indicating a shift relationship between a first content item that serves as an element of the interest user preference vector located in a first predetermined cluster in a first layer and a second content item that belongs to the first cluster in the first layer and a second cluster in a second layer, wherein the long term interests indicate a method wherein the similarity between a preference user preference vector and the recommendation vector is computed, the recommendation vector being classified into a similar, dissimilar, and shift group; and wherein the knowledge indicates a method wherein the recommendation vector is determined as known or unknown in accordance with a cluster to which the recommendation vector belongs; the recommendation vector being determined as known when a cluster in which the number of content items that are elements of the preference user preference vector is large and the recommendation vector being determined as unknown when a cluster in which the number of content items that are elements of the preference user preference vector is small.

16. A non-transitory computer readable storage medium storing a computer program, which when executed by a computer, performs a recommending content method, the method including performing a content recommendation process in which a content item to be recommended is determined by performing selection, filtering, and matching operations on the basis of each of a plurality of strategies, each strategy independently and concurrently performed based on a relationship with short term interests, a long term preference, and knowledge of a user;

wherein the short term interests indicate a method wherein the similarity between an interest user preference vector and a recommendation vector is computed, the recommendation vector being classified into a similar, dissimilar, and shift group, the shift group indicating a shift relationship between a first content item that serves as an element of the interest user preference vector located in a first predetermined cluster in a first layer and a second content item that belongs to the first cluster in the first layer and a second cluster in a second layer, wherein the long term interests indicate a method wherein the similarity between a preference user preference vector and the recommendation vector is computed, the recommendation vector being classified into a similar, dissimilar, or shift group; and wherein the knowledge indicates a method wherein the recommendation vector is determined as known or unknown in accordance with a cluster to which the recommendation vector belongs; the recommendation vector being determined as known when a cluster in which the number of content items that are elements of the preference user preference vector is large and the recommendation vector being determined as unknown when a cluster in which the number of content items that are elements of the preference user preference vector is small.

17. An information processing apparatus for recommending content includes:

a processor;

the processor configured to perform a content recommendation process in which a content item is determined by performing selection, filtering, and matching operations on the basis of each of a plurality of strategies, each strategy independently and concurrently performed based on a relationship with short term interests, a long term preference, and knowledge of a user;

wherein the short term interests indicate a method wherein the similarity between an interest user preference vector and a recommendation vector is computed, the recommendation vector being classified into a similar, dissimilar, and shift group, the shift group indicating a shift relationship between a first content item that serves as an element of the interest user preference vector located in a first predetermined cluster in a first layer and a second content item that belongs to the first cluster in the first layer and a second cluster in a second layer, wherein the long term interests indicate a method wherein the similarity between a preference user preference vector and the recommendation vector is computed, the recommendation vector being classified into a similar, dissimilar, or shift group; and wherein the knowledge indicates a method wherein the recommendation vector is determined as known or unknown in accordance with a cluster to which the recommendation vector belongs; the recommendation vector being determined as known when a cluster in which the number of content items that are elements of the preference user preference vector is large and the recommendation vector being determined as unknown when a cluster in which the number of content items that are elements of the preference user preference vector is small.

* * * * *